Patented Sept. 23, 1924.

1,509,352

UNITED STATES PATENT OFFICE.

CHARLES E. GURR, OF CASPER, WYOMING.

BOILER COMPOUND.

No Drawing. Application filed February 12, 1924. Serial No. 692,435.

*To all whom it may concern:*

Be it known that I, CHARLES E. GURR, citizen of the United States, residing at Casper, in the county of Natrona and State of Wyoming, have invented certain new and useful Improvements in Boiler Compounds, of which the following is a specification.

The present invention relates to a boiler compound and has for its principal object to provide a mixture to be used in boilers for dissolving the scale which forms therein without in any way injuring the boiler.

The compound consists of a mixture of soda ash, rock lime, oxalic acid and crude oil. In forming the composition I take five pounds of the soda ash, four pounds of the rock lime, and one pound of the oxalic acid and after grinding them thoroughly mix them with two gallons of crude oil.

The proportion of the ingredients outlined above gives the best results and will dissolve the scale within a few hours. It is evident, however, that other proportions of the ingredients may be used efficiently.

The amount of this compound which is to be added to the boiler to obtain desired results depends upon the size of the boiler. I will now give a few examples of how the compound may be used. In a boiler of the forty horse power type, such as are used in oil fields in conjunction with oil well drilling apparatus, and that has become coated to approximately an inch in thickness with hard alkali scale, I would use ten pounds of the compound every day for four days. After the fourth day I wash the boiler and remove all loosened scale. After that ten pounds every third day would be sufficient. For locomotive boilers of the large size about twenty five pounds a day should be used for four days and then a wash out should be given the boiler. After that twenty pounds every third day would be sufficient. To treat alkali water before going into the boiler, if one is using a treating plant, it is preferable to use twenty pounds to every eight thousand gallons of water as this will break up all foreign matter in the water. For water that has carbonate lime or any soft scale forming matter in it, it is preferable to use one half of the amount used to break up alkali water. In speaking of the compound in the examples it should be borne in mind that I mean the mixture of the dry ingredients namely four pounds of calcium oxide (unslacked rock lime), five pounds of soda ash and one pound of oxalic acid mixed with eight gallons of boiling water; after other ingredients are thoroughly mixed, I add two gallons of crude (unrefined) oil. The oil mentioned above is that which has been taken from the ground and having not undergone treatment whatsoever. The reason I use calcium oxide (unslacked rock lime) is that when it is mixed with the other ingredients, and is pumped or injected into a boiler, it does not settle to the bottom, as calcium carbonate (air slacked lime) does, but mixes thoroughly with the water and helps to work upon the scale to break the water. The reason for using the unrefined crude oil is to keep the slugge and loosened scale from coming to the top and causing foaming in the boiler. Crude oil, being very heavy, holds the slugge down better than any other grade of oil.

Having thus described my invention, what I claim as new is:

1. A boiler compound consisting of a mixture of soda ash, calcium oxide, oxalic acid and unrefined crude oil.

2. A boiler compound consisting of five pounds of soda ash, four pounds of calcium oxide, and one pound of oxalic acid ground and thoroughly mixed with two gallons of unrefined crude oil.

In testimony whereof I affix my signature in presence of two witnesses.

CHARLES E. GURR.

Witnesses:
 CHAS. P. AMES,
 IVOR J. PARKER.